US011156010B1

(12) United States Patent
Corban

(10) Patent No.: US 11,156,010 B1
(45) Date of Patent: Oct. 26, 2021

(54) METHOD OF DISTRIBUTING ITEMS FROM A TOWER VIA UNMANNED AIRCRAFT

(71) Applicant: Lawrence C Corban, McDonough, GA (US)

(72) Inventor: Lawrence C Corban, McDonough, GA (US)

(*) Notice: Subject to any disclaimer, the term of this patent is extended or adjusted under 35 U.S.C. 154(b) by 0 days.

(21) Appl. No.: 16/116,557

(22) Filed: Aug. 29, 2018

Related U.S. Application Data

(63) Continuation-in-part of application No. 14/869,804, filed on Sep. 29, 2015, now abandoned.
(Continued)

(51) Int. Cl.
*B64F 1/32* (2006.01)
*E04H 1/12* (2006.01)
(Continued)

(52) U.S. Cl.
CPC ............ *E04H 1/1205* (2013.01); *B64F 1/222* (2013.01); *B64F 1/32* (2013.01); *G01G 19/62* (2013.01);
(Continued)

(58) Field of Classification Search
CPC .. B64F 1/00; B64F 1/007; B64F 1/222; B64F 1/32; B64C 2201/128; E04H 6/00;
(Continued)

(56) References Cited

U.S. PATENT DOCUMENTS

| 2,481,343 A | * | 9/1949 | Redstone | E01F 3/00 244/114 R |
| 3,033,499 A | * | 5/1962 | Ash | E04H 3/00 244/114 R |

(Continued)

FOREIGN PATENT DOCUMENTS

| EP | 2974958 A2 * | 1/2016 | ........... B64C 39/024 |
| JP | 02058605 A * | 2/1990 | ................ B64F 1/00 |

(Continued)

OTHER PUBLICATIONS

Bachrach, A., He, R., & Roy, N. (2009). Autonomous Flight in Unknown Indoor Environments. International Journal of Micro Air Vehicles, 217-228. https://doi.org/10.1260/175682909790291492 (Year: 2009).*

(Continued)

*Primary Examiner* — Richard R. Green
*Assistant Examiner* — Michael A. Fabula
(74) *Attorney, Agent, or Firm* — Hill, Kertscher & Wharton, LLP; Gregory T. Ourada

(57) ABSTRACT

A tower stores unmanned aircraft and shipping containers inside. The unmanned aircraft are controlled by the tower's integrated computer to enable immediate distribution of the shipping containers upon a customer request. Upon a customer request, the tower autonomously dispatches the unmanned aircraft stored inside to rapidly fly out of the tower to deliver a shipping container directly to a specified location outside. Once dispatched by the tower's computer system, the unmanned aircraft autonomously fly from storage in the tower through the tower's interior space and exit the tower through internal shafts that lead to an opening in its exterior walls to deliver a shipping container cheaper and faster than traditional means.

1 Claim, 14 Drawing Sheets

Related U.S. Application Data

(60) Provisional application No. 62/057,182, filed on Sep. 29, 2014.

(51) Int. Cl.
| | |
|---|---|
| *B64F 1/22* | (2006.01) |
| *G06Q 10/08* | (2012.01) |
| *G01G 19/62* | (2006.01) |
| *B64C 39/02* | (2006.01) |

(52) U.S. Cl.
CPC .......... *G06Q 10/083* (2013.01); *B64C 39/024* (2013.01); *B64C 2201/128* (2013.01); *B64C 2201/18* (2013.01); *B64C 2201/206* (2013.01)

(58) Field of Classification Search
CPC .. E04H 6/005; E04H 6/06; E04H 6/08; E04H 6/12; E04H 6/18; E04H 6/44
See application file for complete search history.

(56) References Cited

U.S. PATENT DOCUMENTS

| | | | |
|---|---|---|---|
| 3,520,502 A | 7/1970 | Smethers | |
| 3,556,441 A * | 1/1971 | Oberlander | B64F 1/00 244/114 R |
| 3,915,319 A * | 10/1975 | Fairburn | E04H 6/44 187/266 |
| 4,109,804 A * | 8/1978 | Leon Moyano | E04H 6/186 414/254 |
| 4,974,795 A * | 12/1990 | Christol | E01F 3/00 244/114 R |
| 5,000,398 A | 3/1991 | Rashev | |
| 5,377,465 A * | 1/1995 | Kobori | E04B 1/3404 52/236.3 |
| 6,359,074 B1 | 3/2002 | Herschbach et al. | |
| 7,900,866 B2 | 3/2011 | Kutzmann et al. | |
| 8,231,083 B2 | 7/2012 | Kutzmann et al. | |
| 8,511,606 B1 * | 8/2013 | Lutke | B64C 39/028 244/100 R |
| 8,650,821 B2 * | 2/2014 | Ely, Jr. | E04B 1/34 244/114 R |
| 8,740,134 B2 | 6/2014 | Suzuki | |
| 9,193,458 B2 | 11/2015 | Pongratz et al. | |
| 9,305,280 B1 | 4/2016 | Berg et al. | |
| 9,384,668 B2 | 7/2016 | Raptopoulos et al. | |
| 9,387,928 B1 * | 7/2016 | Gentry | B64C 39/024 |
| 9,409,644 B2 | 8/2016 | Stanek et al. | |
| 9,494,937 B2 | 11/2016 | Siegel et al. | |
| 9,527,605 B1 * | 12/2016 | Gentry | B64F 1/12 |
| 9,555,885 B2 | 1/2017 | Stanek et al. | |
| 9,656,765 B2 | 5/2017 | von Flotow et al. | |
| 2009/0294573 A1 | 12/2009 | Wilson et al. | |
| 2010/0119338 A1 * | 5/2010 | Webster | E04H 6/18 414/239 |
| 2011/0011014 A1 * | 1/2011 | Halamka | E04H 6/08 52/173.1 |
| 2011/0011015 A1 * | 1/2011 | Halamka | E04H 6/08 52/173.1 |
| 2013/0037650 A1 | 2/2013 | Heppe | |
| 2013/0332008 A1 | 12/2013 | Herman et al. | |
| 2014/0010619 A1 * | 1/2014 | Dor-El | E04H 6/22 414/240 |
| 2014/0032034 A1 * | 1/2014 | Raptopoulos | G08G 5/0069 701/25 |
| 2014/0252168 A1 * | 9/2014 | Brody | B64F 1/00 244/114 R |
| 2014/0254896 A1 | 9/2014 | Zhou et al. | |
| 2014/0260111 A1 | 9/2014 | Phillips et al. | |
| 2015/0158599 A1 * | 6/2015 | Sisko | B64F 1/32 244/114 R |
| 2015/0175276 A1 * | 6/2015 | Koster | B64F 1/32 244/114 R |
| 2015/0336669 A1 * | 11/2015 | Kantor | G08G 5/0013 701/3 |
| 2016/0031564 A1 | 2/2016 | Yates | |
| 2016/0039542 A1 * | 2/2016 | Wang | B60L 11/1809 701/2 |
| 2016/0214717 A1 | 7/2016 | DeSilva | |
| 2016/0257423 A1 * | 9/2016 | Martin | B64F 1/00 |
| 2016/0378108 A1 | 12/2016 | Paczan et al. | |
| 2017/0011333 A1 * | 1/2017 | Greiner | G06Q 10/083 |
| 2017/0158353 A1 * | 6/2017 | Schmick | B64F 1/007 |
| 2017/0175413 A1 * | 6/2017 | Curlander | E04H 14/00 |
| 2017/0197710 A1 * | 7/2017 | Ma | G05D 1/0676 |
| 2017/0225802 A1 * | 8/2017 | Lussier | B64F 1/00 |
| 2017/0297672 A1 | 10/2017 | Heppe | |
| 2018/0049575 A1 * | 2/2018 | Yamrick | A47G 29/141 |
| 2018/0105289 A1 * | 4/2018 | Walsh | B60L 11/182 |
| 2018/0118340 A1 * | 5/2018 | Russo | B64D 1/16 |
| 2018/0186454 A1 * | 7/2018 | Luckay | B64D 1/12 |
| 2018/0229859 A1 * | 8/2018 | Evans | B64F 1/362 |
| 2018/0290763 A1 * | 10/2018 | Huang | B64F 1/00 |

FOREIGN PATENT DOCUMENTS

| | | | | |
|---|---|---|---|---|
| WO | WO-02097220 A1 * | 12/2002 | | E04H 6/12 |
| WO | WO-03100197 A1 * | 12/2003 | | B66B 9/04 |
| WO | WO-2018108227 A1 * | 6/2018 | | A47G 29/14 |

OTHER PUBLICATIONS

S. Huh, D. H. Shim and J. Kim, "Integrated navigation system using camera and gimbaled laser scanner for indoor and outdoor autonomous flight of UAVs," 2013 IEEE/RSJ International Conference on Intelligent Robots and Systems, Tokyo, 2013, pp. 3158-3163, doi: 10.1109/IROS.2013.6696805. (Year: 2013).*

T. Tomic et al., "Toward a Fully Autonomous UAV: Research Platform for Indoor and Outdoor Urban Search and Rescue," in IEEE Robotics & Automation Magazine, vol. 19, No. 3, pp. 46-56, Sep. 2012, doi: 10.1109/MRA.2012.2206473. (Year: 2012).*

Phang et al., "Autonomous Mini-UAV for indoor flight with embedded on-board vision processing as navigation system," 2010 IEEE Region 8 International Conference on Computational Technologies in Electrical and Electronics Engineering (SIBIRCON), Listvyanka, 2010, pp. 722-727. (Year: 2010).*

\* cited by examiner

METHOD OF DISTRIBUTING ITEMS FROM A TOWER VIA UNMANNED AIRCRAFT

CROSS REFERENCE TO RELATED APPLICATIONS

This application claims priority under 35 U.S.C. § 120 to application Ser. No. 14/869,804, filed Sep. 29, 2015, and Appl. Ser. No. 62/057,182 filed Sep. 29, 2014, both of which are incorporated herein in their entirety by reference.

BACKGROUND OF THE INVENTIONS

1. Technical Field

The present inventions relate to distribution systems, and, more particularly, relate to sub-systems, methods, and networks for aerial distribution systems.

2. Description of the Related Art

A wealth of commercial distribution methods, systems, sub-systems and networks are documented and routinely operated globally, almost all of which rely heavily on ground transportation, particularly in the first and last mile phases. Because of the enormous cost associated with building and maintaining modern road systems ground transportation infrastructure is highly inadequate in many parts of the world and subsequently limits distribution and creates a major barrier to modernization in developing economies.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE PREFERRED EMBODIMENTS

Figure 1:
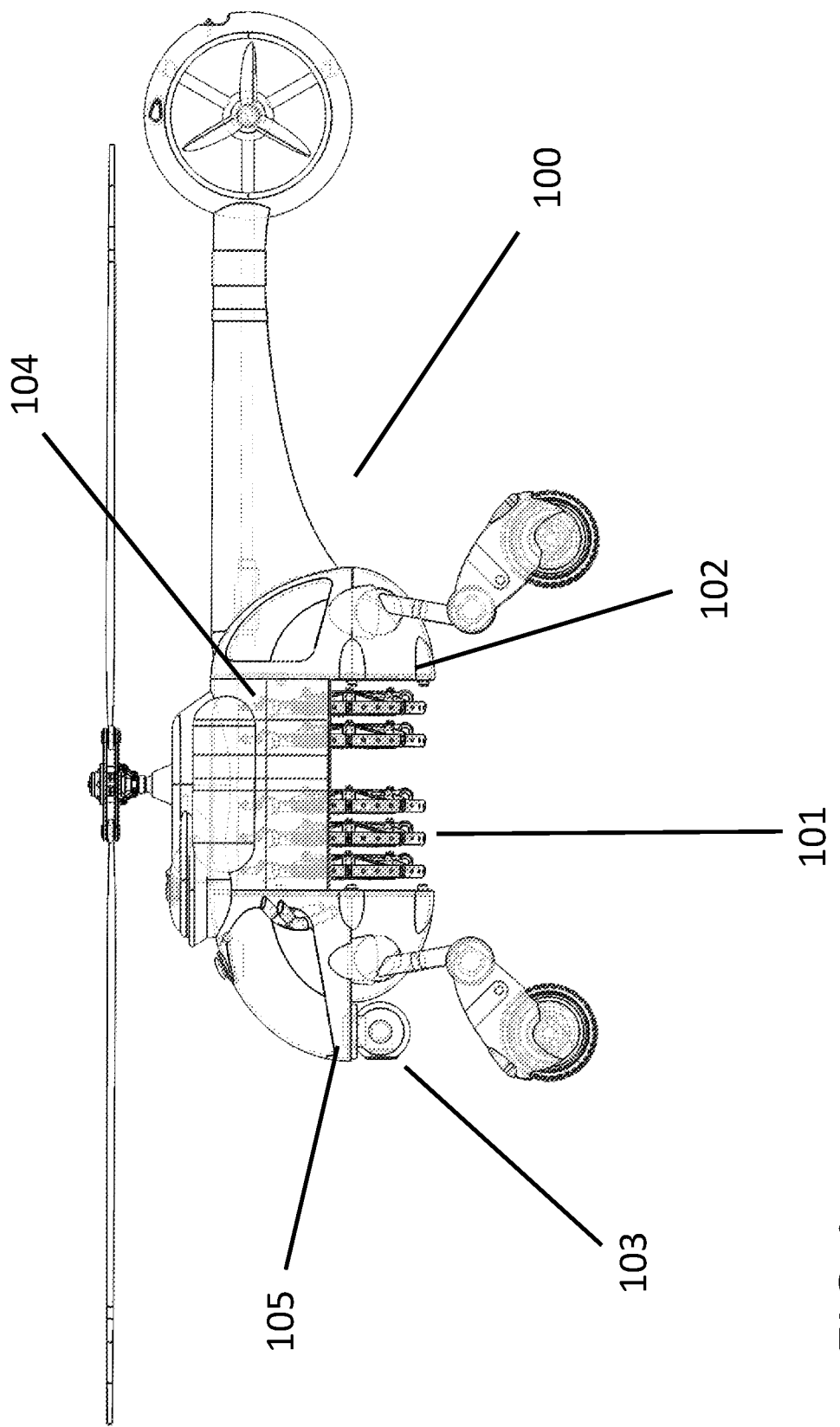
FIG. 1 illustrates a side view of an aircraft storing one or more separate, independent unmanned aircraft in its cargo bay according to embodiments of the present inventions.

What is needed is an aerial distribution network capable of efficiently servicing, in high volume, the first and last mile phases of distribution without any reliance on roads. This could bridge a major gap between poverty and modernization in the developing world and offer numerous benefits to already thriving economies such as lower emissions, improved safety, and relieved congestion on existent road systems.

Both urban and rural environments pose numerous obstacles to any aircraft such as trees, buildings, power lines, fences, etc. In order to reliably service the first and last mile phases of logistics using a flying vehicle it is necessary to fly low to the ground in confined spaces and in close proximity to dense human populations. Large aircraft require a significant area of unobstructed space to take-off and land. Furthermore, for an aircraft to service the first and last mile phases it must be able to routinely pick-up and drop-off its cargo in close proximity to populated areas posing a potentially deadly hazard to large numbers of people on the ground. For this reason small unmanned aircraft are better suited to perform this job. Small unmanned aircraft require less unobstructed space to navigate, take off and land, and can be made to pose significantly less hazard to people on the ground. This being said, current technology does not yet enable miniature, reliable, and very low-cost detection and avoidance of obstacles by small unmanned aircraft systems (sUAS). In order to autonomously navigate, take-off, and land small unmanned aircraft in cluttered environments close to the ground that may pose numerous dynamic obstacles, a guaranteed un-obstructed flight path is preferred over reliance on expensive obstacle avoidance technology. An elevated take-off and landing platform well above any dynamic obstacles, and knowledge of the form and location of inherently static obstructions around the tower provides for a consistently safe take-off and landing approach. Elevating the approach and exit path for a small unmanned aircraft system's take-off and landing also provides inherent safety advantages, both to the public as well as to the vehicles. Elevating the take-off and landing area allows for an unobstructed approach and exit path for a small unmanned aircraft system's take-off and landing and also denies the general public easy access to the small unmanned aircraft systems which could otherwise be interfered with or stolen. Furthermore, with the launch and recovery operation elevated, global positioning system (GPS) navigation signals are much more reliable. The primary way of navigation to the target landing area in embodiments is using GPS. The GPS can be aided or substituted in some cases by one or more radio beacon emitters, radio beacon sensor, infrared beacon emitters, vision-based navigation using images of visual patterns, cameras or some other high precision relative navigation system using electronic sensors and/or emitters to achieve repeatable launch and recovery results.

A kiosk is disclosed, from which users can insert and extract cargo, that provides the elevated small unmanned aircraft take-off and landing area described above, and that is capable of autonomously launching, and recovering said small unmanned aircraft. Furthermore, the kiosks ability to autonomously manage incoming and outgoing deliveries as well as sort, load and unload cargo from small unmanned aircraft is novel. Furthermore, two or more of the described kiosks used to create a distribution network is novel. It should be noted that the small unmanned aircraft systems described above can be remotely piloted, semi-autonomous, or fully autonomous. Likewise they could be of any flying vehicle type, for example fixed wing, rotary wing, multi-copter, tail-sitting, vertical take-off and landing (VTOL) or compound. The kiosk can also be integrated with a home or building to act as an equivalent to a mailbox.

Secondly, small vertical take-off and landing unmanned aircraft systems as described above have extremely limited range, especially when relying on batteries for energy. A combination of long and short range vertical take-off and landing unmanned aircraft systems that work together, exploiting the endurance capabilities of larger, fuel powered vertical take-off and landing aircraft while maintaining the ability to safely operate in confined spaces low to the ground in heavily populated areas (i.e. as is required to deliver packages in both urban and rural environments) with small, all-electric short range unmanned aircraft is novel and required to meet the demanding endurance requirements of efficient wide-spread logistics and package distribution. This combination allows for safe and efficient first and last mile distribution of large volumes of cargo between vast, wide spread communities. While the concept relies heavily on vertical take-off and landing unmanned aerial vehicles because of their unique ability to operate at extremely low speeds and even hover while docking with one another as well as their minimal need for ground support infrastructure, it should be noted that one or more vehicles utilized by the network can be of any type, whether manned, unmanned, rotorcraft, vertical take-off and landing, fixed wing, compound, maritime, space, ground or lighter-than-air.

FIG. 1 illustrates a transparent side view of an aircraft 100, embodied as an unmanned helicopter. The aircraft 100 is storing one or more separate, independent unmanned aircraft 101, embodied as unmanned multi-copters on an actuated rack mechanism 104 integrated with the aircraft's 100 payload bay 102. Both the aircraft 100 and the separate, independently functional unmanned aircraft 101 can be de-coupled to operate as independently functional aircraft according to embodiments of the present inventions. Wherein a total weight of the set of the independent unmanned aircraft 101 is less than the aircraft 100. The aircraft 100 serves to extend the range of the separate, independently functional unmanned aircraft 101 stored in its payload bay 102. Both the large aircraft 100 and the smaller independent unmanned aircraft 101 stored in it's payload bay 102 can be used to deliver cargo. The aircraft 100 can have one or more integrated cameras or sensors 103 that can be gimbaled or fixed. The aircraft 100 can comprise a flight controller 105 embodied as a computer processor, accelerometers, and other sensors. Wherein the aircraft 100 comprises an aeronautical lift coupled to the main body capable of suspending the aircraft in open airspace. Wherein the aeronautical lift is chosen from the group consisting of wings, rotors, rockets and lighter than air gases such as helium.

Figure 2:
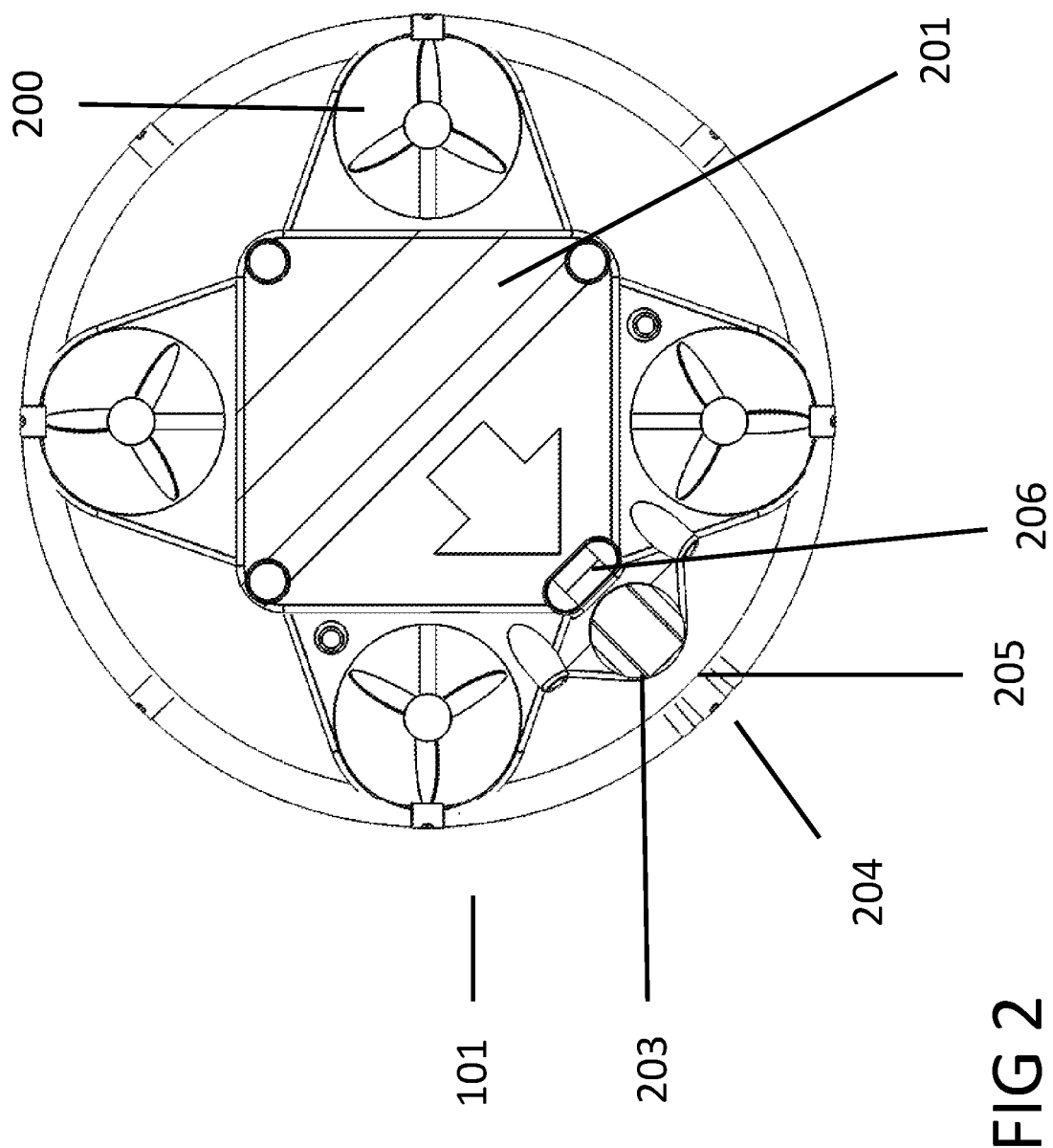
FIG. 2 illustrates a top view of an unmanned aircraft according to embodiments of the present inventions.

FIG. 2 illustrates a top view of an unmanned aircraft 101 embodied as a multi-copter. The unmanned aircraft 101 embodied as a multi-copter has shielded rotors 200 for safety and a payload bay 201 according to embodiments of the present inventions. The payload bay 201 can be enclosed and have an actuated door. The payload bay 201 can be designed to accept a standardized shipping container 503. The unmanned aircraft 101 embodied as a multi-copter can have one or more integrated cameras or sensors 203 that can be gimbaled or fixed as well as one or more integrated radio beacons, visual patterns, images of visual patterns, cameras, infrared beacons, or other electronic sensors or emitters 204 to support a relative navigation solution for docking with the aircraft 100, taking off and landing atop the kiosk 400, and/or navigating the hollow shafts 403 within the kiosk 400. The unmanned aircraft 101 can comprise a mechanical interface 205 compatible with the positive capture mechanism 300 for docking with the aircraft 100. The unmanned aircraft 101 can comprise an autonomous flight controller 206 embodied as a computer processor, accelerometers, and other sensors. Wherein the unmanned aircraft 101 comprises an aeronautical lift coupled to the main body capable of suspending the unmanned aircraft in open airspace. Wherein the aeronautical lift is chosen from the group consisting of wings, rotors, rockets and lighter than air gases such as helium.

Figure 3:
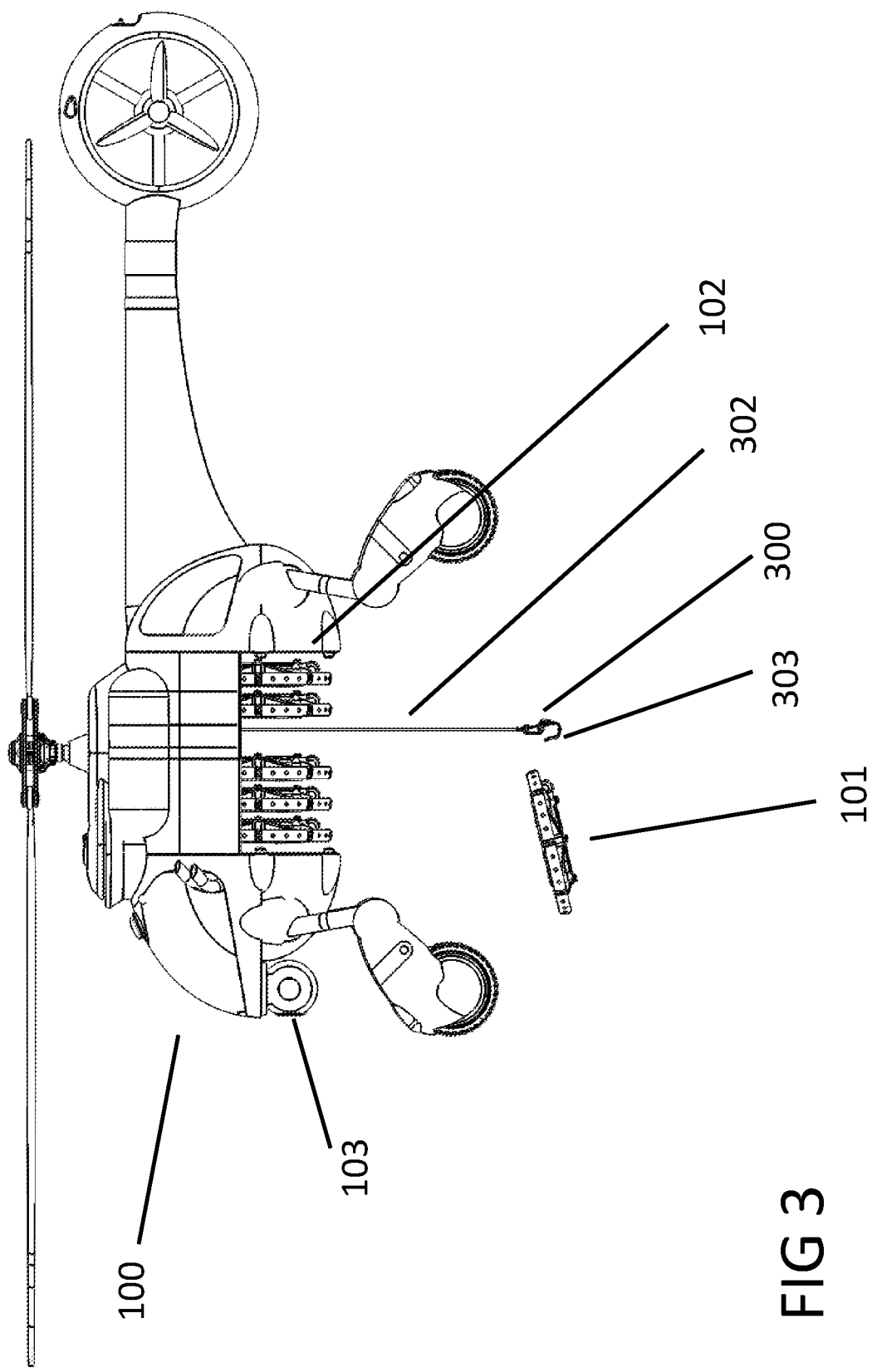
FIG. 3 illustrates a side view of an aircraft docking with a separate, independent unmanned aircraft while in flight according to embodiments of the present inventions.

FIG. 3 illustrates a side view of an independent unmanned aircraft 101 being released from the payload bay 102 of an aircraft 100 while in flight, subsequently operating as two or more independently functional aircraft according to embodiments of the present inventions. Likewise, FIG. 3 illustrates an independent unmanned aircraft 101 preparing to autonomously dock with an aircraft 100 in flight according to embodiments of the present inventions. It should be noted that this docking can occur autonomously, semi-autonomously, or manually. In all cases a positive capture mechanism 300, which can be embodied as a retractable hook or other mechanical device mounted within the payload bay 102 of the aircraft 100 can be used to positively capture (dock), take control over, and/or release the separate, independently functional unmanned aircraft 101. The positive capture mechanism 300 can be integrated with an electronic hoist 302 integrated within the payload bay 102 of the aircraft 100 to be used for lifting the separate, independent unmanned aircraft 101 into the payload bay 102 of the aircraft 100 after docking to be stored on the rack 104. Likewise the hoist 302 can be used to lower an independent unmanned aircraft 101 out of the aircraft's 100 payload bay 102 for release. One or more radio beacons, visual patterns, images of visual patterns, cameras, infrared beacons, or other electronic sensors or emitters 303 can be integrated with the positive capture mechanism 300 to support a relative navigation solution for mid-air docking with the separate, independent unmanned aircraft 101. The positive capture mechanism 300 can be mechanically extended outside of the aircraft's 100 cargo bay using the hoist 302 or other actuated mechanism to guide and then dock with the separate independent unmanned aircraft 101 and retract the separate, independent unmanned aircraft 101 into the cargo bay 102 of the aircraft 100 using the electronic hoist 302 where it can be stowed on the actuated mechanical rack 104 or other mechanism integrated within the payload bay 102 of the aircraft 100. Likewise, FIG. 3 illustrates a small unmanned aircraft 101 preparing to autonomously dock with a larger, aircraft 100 while in flight according to embodiments of the present inventions.

Figure 4:
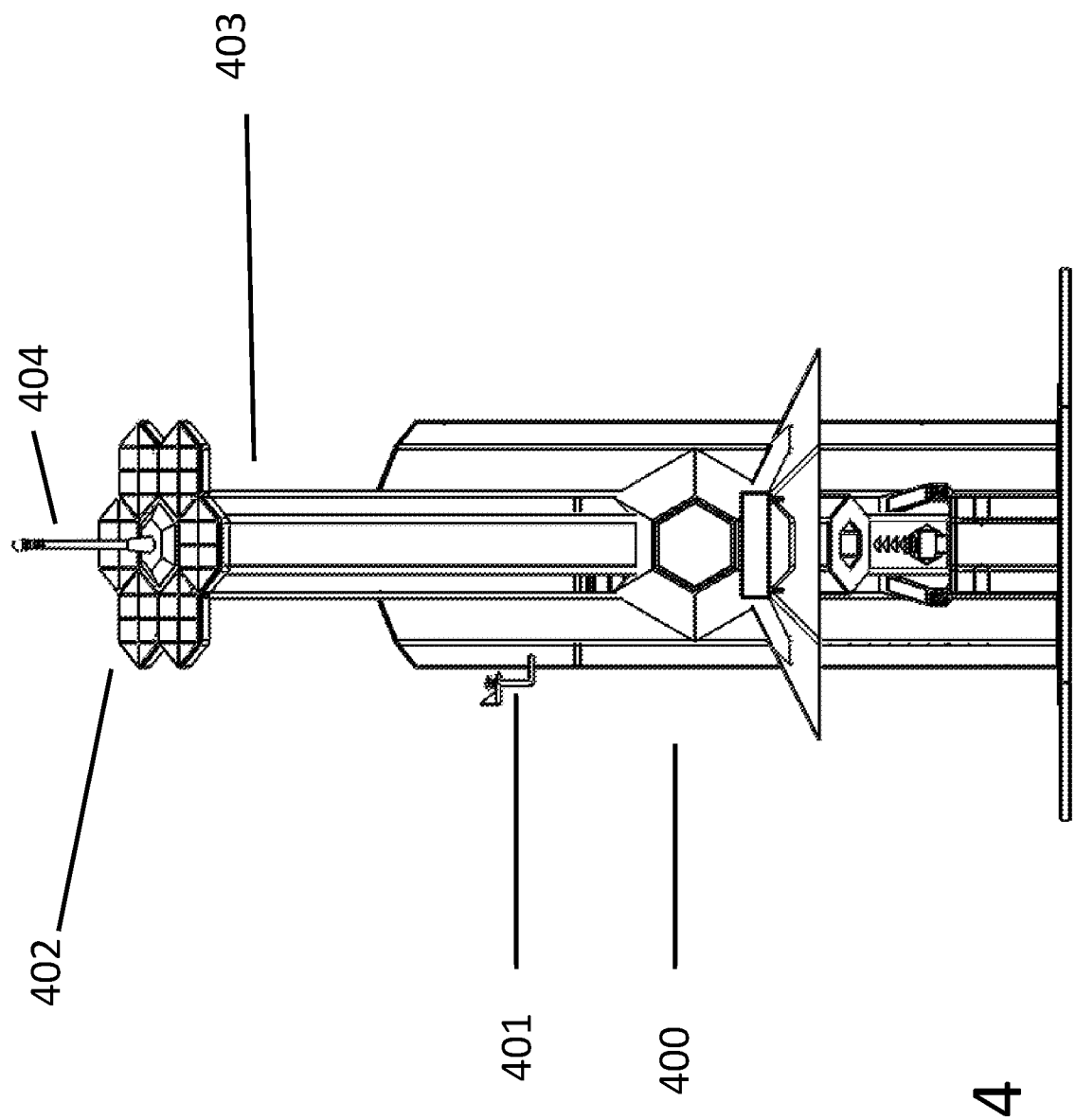
FIG. 4 illustrates a front view of a kiosk according to embodiments of the present inventions.

FIG. 4 illustrates a front view of a kiosk 400 according to embodiments of the present inventions. The kiosk 400 can be pre-fabricated and is capable of sending and receiving cargo according to embodiments of the present inventions. The kiosk 400 can be self-sustaining (e.g. optional use of solar panels 402, generators, or otherwise to operate off-grid). The kiosk 400 can be manned or unmanned. The kiosk 400 can be operated autonomously or by one or more personnel. An end user can walk up to the kiosk 400, place his or her item/items to be shipped within a standardized shipping container 503 available at the kiosk 400, weigh the filled standardized shipping container 503 using a scale 504 integrated with the kiosk 400, interact with the kiosk 400 in order to prescribe the destination address and various shipping options such as speed of delivery service and/or notification of delivery, pay for shipping the cargo and then insert the cargo into the kiosk 400. Likewise, a consumer can extract a standardized shipping container 503 from the kiosk 400 addressed to him or her once they have proven their identity using features of the kiosk 400 or by interacting with personnel operating the kiosk 400. The identity of a user can be proven in various ways such as via a password, pass code, pin number, smart phone app, biometric, identification card, radio frequency identification (RFID), or bar code. The kiosk 400 can have embedded wireless communication equipment such as radio, mobile telephone network, or satellite links and have one or more elevated antennae's 404. Likewise, the kiosk 400 can support wired communication via connection to a telephone network, Ethernet, internet, and/or fiber optic. The kiosk 400 is capable of securely storing one or more standardized shipping containers 503 within it's walls, as well as unmanned aircraft 101. The unmanned aircraft 101 warehoused within can be launched and recovered from the kiosk 400 as well as re-energized inside with a charger 705. Inside the kiosk 400 the standardized shipping container 503 can be tagged, tracked, and dispatched. This tagging, tracking, and dispatching can be done electronically through an electronic line of communication between the kiosk 400 and the shipping container 503. This line of communication can accomplished through either a wired or wireless connection. The kiosk 400 is capable of being powered off-grid via solar panels 402 or otherwise for local power generation, or on-grid via shore power. The kiosk is built with security in mind and acts as a secure warehouse for the standardized shipping container 503 and unmanned aircraft 101 stored inside. The kiosk 400 can act as an advertising platform via print, video or other types of visual or audio displays. The kiosk 400 can also be equipped with speakers and interact with users audibly. This kiosk 400 can be stationary or mobile and integrated with any type of vehicle be it ground, air, maritime, or space. The kiosks 400 can be integrated with one or more Post Office (P.O.) Boxes 900 from which standardized shipping containers 503 can be sent and received. The floor or furniture of the P.O. Box 900 can have a built in scale to verify the standardized shipping container 503 does not exceed its maximum acceptable weight. If the weight of the standardized shipping container 503 is exceeded the kiosk's 400 software will reject it and not allow it to be shipped. The kiosk 400 can be integrated with an optional helipad 1000 for the aircraft 100. The helipad 1000 can be used to launch, recover, and service the aircraft 100 according to embodiments of the present inventions. Helipad 1000 can be surrounded by a fence to protect the aircraft 100 from the public as well as keep the public a safe distance from the aircraft 100 while in operation. A distribution network may include one or more kiosks 400. The helipad 1000 can also act as a fueling station for aircraft 100 and allow for shipping and receiving of heavy, bulky cargo not supported by the unmanned aircraft 101 via an aircraft 100 in a large shipping container 1003. The kiosk 400 can also employ one or more integrated meteorological devices 401 to measure and predict weather such as wind measurement devices, rain detection devices, thermometers, barometers, density altitude measurements, and humidity. A tower is created by the kiosk's 400 one or more long, hollow shafts 403, which can be either vertical or horizontal, through which small unmanned aircraft 101 can fly or be mechanically transported according to embodiments of the present inventions. In the case of the hollow shaft 403 being vertical, a tall tower is created. The unmanned aircraft 101 are subsequently launched and recovered from the end of this shaft 403.

Figure 5:
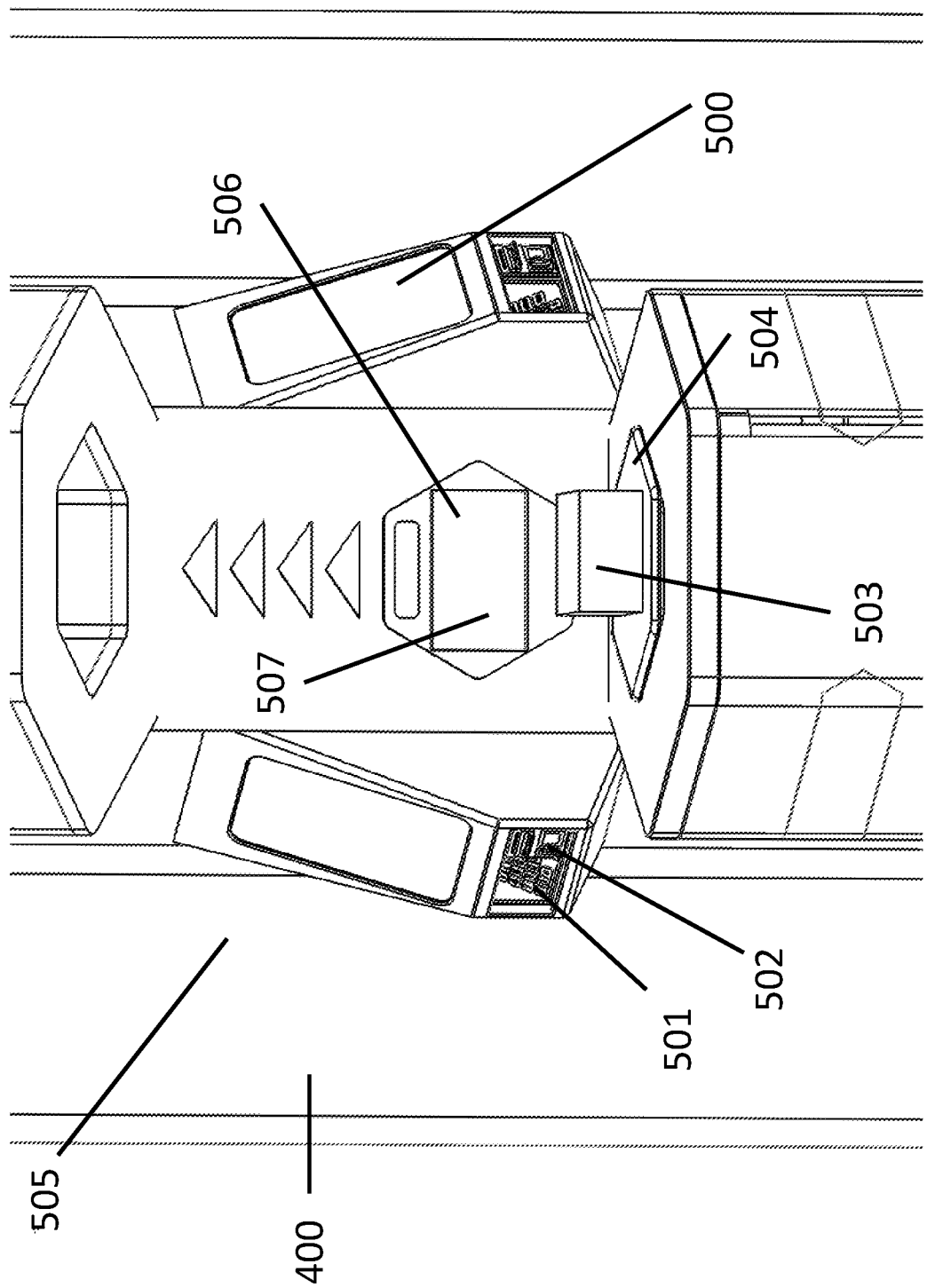
FIG. 5 illustrates a front view of an interactive user interface of a kiosk according to embodiments of the present inventions.

FIG. 5 illustrates a front view of an interactive user interface 505 of a kiosk 400 according to embodiments of the present inventions. The user interface 505 can comprise one or more video displays 500 that can be embodied as a touchscreen, keypads 501, credit card swipers 502, and biometric security sensors. Additional features may be included to enhance the interface or simplify its use. A standardized shipping container 503 can be seen sitting on an integrated scale 504 integrated into the kiosk 400 ready to be weighed. One or more outside or inside walls of the standardized shipping container 503 can be embodied as a digital screen to display information or advertisements. Furthermore the standardized shipping container 503 can be fitted with speakers and interact with the consumer audibly to convey information or advertisements. These advertisements can be opt-in or opt-out. If a consumer opts-in the price of shipping can be reduced or eliminated. The kiosk 400 can comprise software that will not accept a standardized shipping container 503 weighing more than a predetermined maximum weight. This is to ensure that, once loaded, the unmanned aircraft 101 tasked with transporting the standardized shipping container 503 will not be overloaded. Users can use this interactive user interface 505 to specify the delivery address of their standardized shipping container 503, specify the recipient of their standardized shipping container 503, verify their own identity, pay for goods and services, view advertisements, and specify desired delivery times and other delivery options. A user can also interact with this user interface 505 via a smart phone app, tablet, laptop computer, desktop computer or any of the identified communication approaches described under FIG. 4. A user can enter a standardized shipping container 503 into the kiosk 400 through one or more doors 506 as well as extract a standardized shipping container through those doors 506. The door 506 can be securely sealed and locked until the kiosk 400 approves acceptance of the standardized shipping container 503. Once approved the door can be unlocked and opened to allow the user to insert or extract the standardized shipping container 503. The scale 504 can also be integrated behind this door in an interlock 507. The floor or furniture of this interlock 507 can be embodied as the scale 504. The scale 504 can be operably coupled to a processor 704 to control acceptance of shipping containers 503 that are weighed on said scale to verify that said shipping container 503 does not exceed the specified maximum shipping weight. When the door 506 is open a user can enter his or her shipping container 503 into the interlock 507 for shipping. Once the shipping container is placed in the interlock 507, the door 506 is closed and locked. The scale 504 then weighs the shipping container 503 to insure that it does not exceed the maximum specified shipping weight. If the weight is not exceeded the shipping container 503 is entered into the kiosk without allowing the sender any further access to the shipping container 503. If the maximum weight is exceeded the door 506 is opened and the user must remove the shipping container 503, and then remove contents from the shipping container 503 until it meets the specified weight requirement and place it into the interlock 507 for weighing again. The interlock 507 serves to disallow a user from overloading a shipping container 503 by disallowing any modification to the contents of the shipping container once weighed by the scale 504 integrated with the interlock 507. The door 506 can be unlocked and opened either manually by the user or autonomously by the kiosk 400. Likewise, the kiosk 400 can be manned by personnel who can approve and accept the standardized shipping container 503. The kiosk design may include advanced security measures, such as an interlock 507, behind the door 506 to prevent tampering with the kiosk 400 internals while the door 506 is unlocked and/or exposed.

Figure 6:
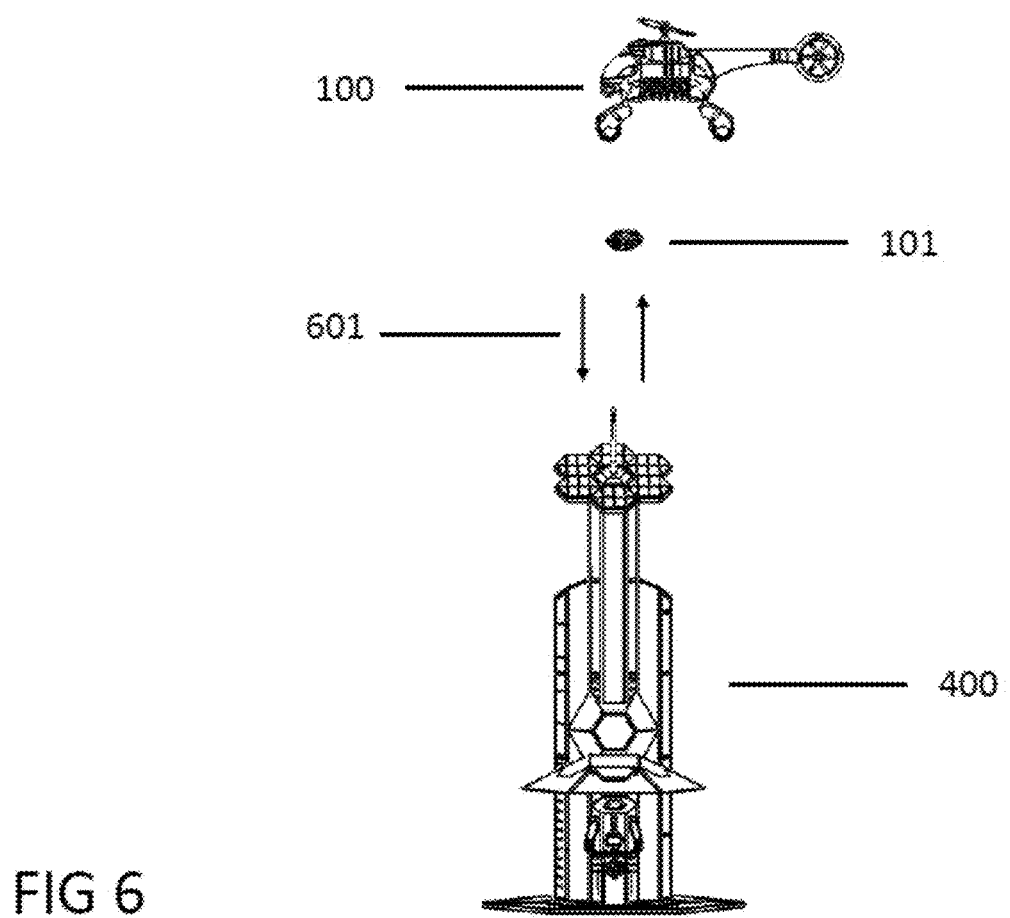
FIG. 6 illustrates a front view of kiosk, an aircraft, and an unmanned aircraft according to embodiments of the present inventions.

FIG. 6 illustrates a front view of a kiosk 400, aircraft 100, and independent unmanned aircraft 101 working together as a system to deliver cargo according to embodiments of the present inventions. A shipping container 503 is entered into the kiosk 400 with a specified delivery address. Through a distributed computer network and wireless communication alerts 601 an aircraft 100 within range that a shipping container 503 is ready for pick-up. The aircraft 100 carrying one or more independent unmanned aircraft 101 in its cargo bay 102 navigates within the range of an independent unmanned aircraft's 101 range of the kiosk 400. The independent unmanned aircraft 101 is released from the cargo bay 102 of the aircraft 100 and flies down to land at the elevated take-off and landing area 800 provided by the kiosk 400. The independent unmanned aircraft 101 enters the hollow shaft 403. Once inside the kiosk the independent unmanned aircraft maneuvers, either by its own power or a series of mechanism, through the kiosk to be loaded with the shipping container 503. Once the shipping container 503 is loaded into the cargo bay 201 of the independent unmanned aircraft 101, the independent unmanned aircraft 101 exits the kiosk 400 via the hollow shaft 403 and elevated take-off and landing area 800. Once out of the kiosk the independent unmanned aircraft 101 flies back to the aircraft 100 using its flight controller 206 configured for relative navigation with the aircraft 100. The aircraft 100 hovers while waiting for the independent aircraft 101 to dock with it. The aircraft 100 lowers its positive capture mechanism 300 using the hoist 302 integrated with the cargo bay 102. The independent unmanned aircraft 101 navigates relatively to the positive capture mechanism 300 using integrated radio beacons, radio beacon sensors, visual patterns, images of visual patterns, cameras, infrared beacons, or some other high precision relative navigation solution comprising a combination of sensors or emitters 204 and then docks with the aircraft 100 while in flight. Once the independent unmanned aircraft is positively captured by the positive capture mechanism 300 it is hoisted into the cargo bay 102 by the hoist 302 of the aircraft 100. The aircraft 100 then flies the stowed independent unmanned aircraft 101 to within its range of the delivery address where it is again released, flown to the kiosk and delivered.

Figure 7:
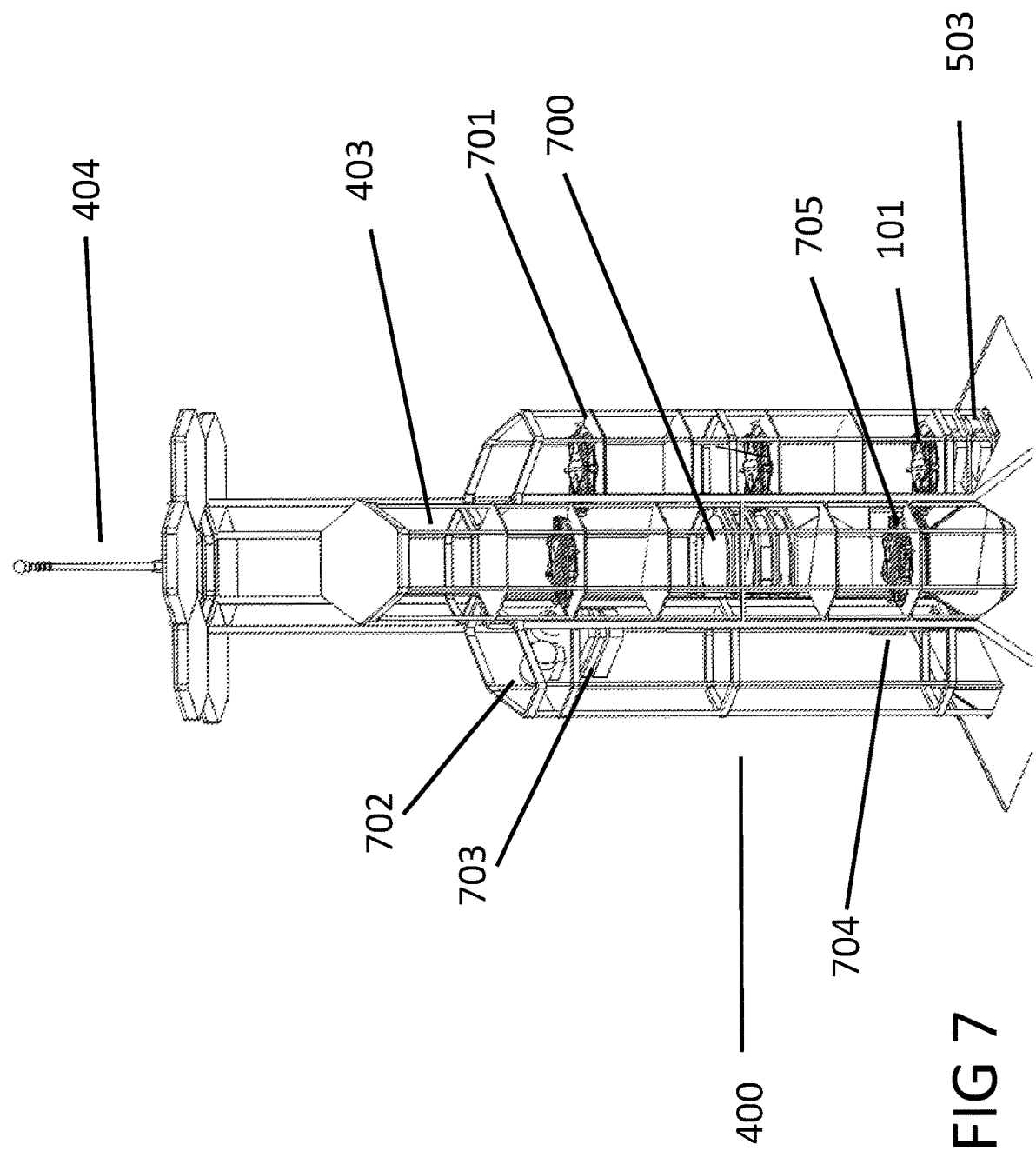
FIG. 7 illustrates a transparent view of the rear of a kiosk to illustrate the internal mechanical design of the kiosk according to embodiments of the present inventions.

FIG. 7 illustrates a transparent view of the rear of the kiosk 400 to illustrate the internal mechanical design of the kiosk 400 according to embodiments of the present inventions. Inside the kiosk are one or more elevators 700 to transport unmanned aircraft 101 and standardized shipping containers 503 through a series of hollow shafts 403. The elevators can comprise one or more electric motors 702 and counterweights 703. The kiosk 400 can comprise one or more Racks 701 for storing one or more standardized shipping containers 503 or unmanned aircraft 101. The racks 701 can be mechanically actuated. The elevators 700 can distribute standardized shipping containers 503 and unmanned aircraft 101 for storage on the racks 701. The elevators can comprise a rotating floor as well as can be actuated, comprise a mechanical arm or able to tilt in order to slide standardized shipping containers 503 off the elevator or otherwise move the standardized shipping containers 503. The elevators 700 can also comprise a conveyor belt mechanism to move standardized shipping containers 503. The racks 701 for storing the standardized shipping containers 503 can also be mechanically actuated in the same manner in order to move standardized shipping containers 503 on and off of them. unmanned aircraft 101 are capable of maneuvering themselves within the kiosk 400 by their own power through a series of vertical and horizontal shafts 403. Unmanned aircraft 101 navigate these channels using relative navigation techniques implementing radio beacons, radio beacon sensors, visual patterns, images of visual patterns, cameras, infrared beacons, or some other high precision relative navigation solution comprising a combination of sensors or emitters to achieve repeatable results. These sensors and emitters can be integrated within the walls, shelves 701, elevators 700, and hollow shafts 403 of the kiosk 400 as well as the unmanned aircraft 101. Alternately they may employ physical mechanisms via contact such as the elevators 700 to move through portions of the kiosk 400. A combination of flight and physical contact may alternately be employed. The standardized shipping containers 503 fit within a payload bay 201 of the unmanned aircraft 101 and can be loaded and unloaded from the payload bay 201 inside the kiosk 400 via a robotic arm or other mechanism. The unmanned aircraft 101 can also position themselves below the standardized shipping container 503 on the racks 701 which can then be dropped into the unmanned aircraft's 101 cargo bay 201 through a trap door on the rack 701. The unmanned aircraft 101 can also have an actuated door of some sorts on the bottom of its payload bay 201 and subsequently land on top of the standardized shipping container 503 to pick it up using relative navigation techniques implementing radio beacons, visual patterns, images of visual patterns, cameras, infrared, or some other high precision relative navigation solution utilizing a combination of sensors and emitters. These sensors and emitters can be integrated with the unmanned aircraft's 101 cargo bay 201 and standardized shipping container 503 to achieve repeatable results. The kiosk 400 also contains a series of conveyor belts and other robotic systems to allow the standardized shipping container 503 and unmanned aircraft 101 to be moved about within. All of the actions described above can also be performed by any number of personnel manning the kiosk 400. The kiosk 400 can also comprise a computer processor 704. The kiosk also has an integrated charging mechanism 705 for unmanned aircraft. The recharging mechanism can be integrated with the rack 701.

Figure 8:
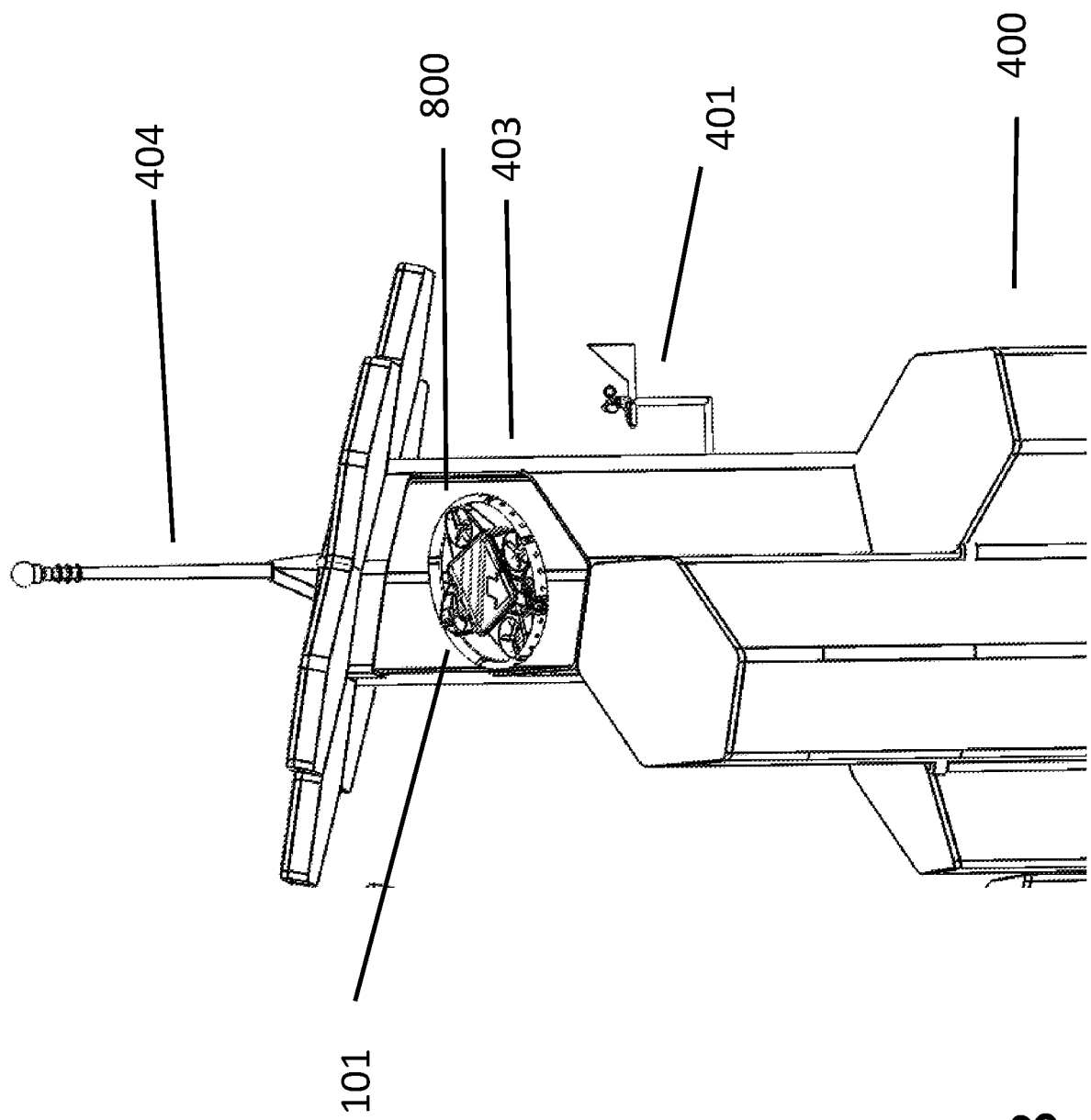
FIG. 8 illustrates an orthogonal view of an elevated take-off and landing area located on a tower top with an unmanned aircraft being launched and recovered from the kiosk according to embodiments of the present inventions.

FIG. 8 illustrates an orthogonal view of an elevated take-off and landing area 800 for said unmanned aircraft 101. Said elevated take-off and landing area 800 can be located at the top of a tower created by the kiosks 400 one or more long, hollow shafts 403, which can be either vertical or horizontal, through which small unmanned aircraft 101 can fly or be mechanically transported according to embodiments of the present inventions. In the case of the hollow shaft 403 being vertical, a tall tower is created. The unmanned aircraft 101 are subsequently launched and recovered from the end of this shaft 403. Likewise, small unmanned aircraft 101 can be raised to the take-off and landing area 800 located at the end of the shaft 403 via an elevator 700. There can be a door that covers the opening at the end of the shaft 403 through which small unmanned aircraft 101 can enter and exit. This door will only open for the brief period of time it takes small unmanned aircraft 101 to enter and depart. This maintains a secure environment within the kiosk 400 and prevents tampering. Furthermore, the design may include advanced security measures, such as an interlock 507, to prevent tampering with the kiosk 400 internals while this opening is unlocked and the inside of the hollow shaft 403 is exposed.

Again unmanned aircraft 101 navigate these hollow shafts 403 using relative navigation techniques implementing radio beacon emitters, radio beacon sensor images of visual patterns, cameras, infrared beacon emitters, or some other high precision relative navigation solution comprising a combination of sensors or emitters to achieve repeatable results, or employ mechanics such as the elevator 700 to traverse the hollow shaft 403

Algorithms implemented as computer software run on one or more computers to coordinate the use and interaction of a large number of aircraft 100, and separate, independently functional unmanned aircraft 101 throughout a distribution network to accomplish the delivery of all standardized shipping container 503 in the system in an efficient manner. The algorithms may run on a central computer or across a distributed computer network, but in either case, use data shared between multiple elements of the overall network. In this way the activities of all the flight vehicles are coordinated to enable timely pickup and drop off, to route all the vehicles, as well as to deconflict the flights of various unmanned aerial vehicles, and to compensate as needed when shipping volume picks-up or drops-off, or in anticipation of such changes, to compensate when one or more vehicles malfunction or require maintenance, to allow for proper recharging and refueling time, to allow for variation in weather conditions that may effect flight operations, in order to make the most efficient use of the total resources and also to ensure on-time delivery. The kiosk 400 can also employ one or more integrated meteorological devices 401 to measure and predict weather such as wind measurement devices, rain detection devices, thermometers, barometers, density altitude measurements, and humidity.

The independently functional unmanned aircraft 101 are launched from the kiosk 400 at the right time and fly to a larger aircraft 100 that has pre-positioned itself to be within the independent unmanned aircraft's 101 operational range. The aircraft 100 can be of any type, ground, air, sea or space, rotary, compound or fixed winged, and be either manned or unmanned. Likewise the unmanned aircraft 101 can be of any type ground, air, sea or space, rotary, compound or fixed winged, and be either manned or unmanned.

At this point the independent unmanned aircraft 101 is recovered by the aircraft 100. Recovering is defined as docking. This recovery, or docking, can be achieved in flight or on the ground. This recovery can be executed using a retractable hook or other type of positive capture mechanism 300 capable of also releasing the independent unmanned aircraft 101, and a single or combined relative navigation technique implementing radio beacon emitters, radio beacon emitter, images of visual patterns, cameras, infrared beacon emitters, or some other high-precision relative navigation solution comprising a combination of sensors and emitters integrated with the positive capture mechanism, aircraft, cargo bay, or unmanned aircraft to achieve repeatable precision navigation results for docking. In all cases, both the aircraft's and independent unmanned aircraft's ability to hover while in flight is utilized while docking. Both the aircraft and independent unmanned aircraft are of the vertical take-off and landing type allowing them to slow to extremely low speeds while in flight as well as hover. Any other aircraft, especially a fixed-wing, would stall in these conditions and be no longer able to maintain flight. The docking of the independent unmanned aircraft 101 with the aircraft 100 can occur at a very low speed, less than 50 mph, so that drag on the hoist 302 and positive capture mechanism 300 are allowed to dangle straight down. This ability to dock while hovering or at very low speeds, sometimes less than 25 mph, also allows for simplification of the positive capture mechanism 300 and the relative navigation solution employed by both the aircraft 100 and the independent unmanned aircraft 101. It is much simpler to navigate relative to a stationary target as opposed to a dynamic moving target. This ability to dock while hovering or at very low speeds, sometimes less than 10 mph, reduces the risk of collision between the aircraft 100 and the independent unmanned aircraft 101 while docking with one another. This ability to dock while hovering or traveling at speeds is unique. Because the aircraft 100 and independent unmanned aircraft 101 are traveling at such low speed or hovering, and the risk of collision is reduced they can operate in much closer proximity to one another while docking minimizing the length the hoist 302 must extend to dock with the independent unmanned aircraft 101 in return reducing the overall weight of the hoist mechanism and increasing the performance of the aircraft 100. It should be noted that an aircraft 100 or independent unmanned aircraft 101 hovering relative to a point on the ground does not necessarily mean it must be motionless. The aircraft holds position as best it can given environmental conditions, such as wind, and flight controller bandwidth and accuracy. Because the independent unmanned aircraft 101 must be of the vertical take-off and landing type to take-off and land from the kiosk 400, the aircraft 100 must be as well. This is because vertical takeoff and landing unmanned aircraft travel at relatively low nominal speeds compared to fixed wing aircraft and can become unstable at the higher speeds required to dock with a large fixed wing aircraft, which is required to stay above a threshold speed to avoid stalling. Depending on the size of the aircraft, this threshold speed can easily exceed 100 mph. Furthermore, the aircraft 100 must be embodied as a vertical take-off and landing aircraft and be capable of slowing to speeds lower than 20 mph because the independent unmanned aircraft 101 is embodied as a multi-rotor. Multi-rotors rely on pitch and roll inputs created by disproportionate thrust created by one or more of the multiple rotors. This means that to move forward at a high rate of speed the multirotor body must establish and maintain a high pitch state. This means that the aircraft is tilted forward at a steep rate. This makes it very difficult to present the mechanical interface 205 in a manner compatible with the positive capture mechanism 300 as well as can create problems with the integrated radio beacons, visual patterns, images of visual patterns, cameras, infrared beacons, or other electronic sensors or emitters 204 that support the relative navigation solution for docking. Because the aircraft is tilted, line of sight between these sensors and emitters 204 and those 303 on the aircraft 100 can be disrupted making relative navigation more difficult. The independent unmanned aircraft 101 also has limited control authority while maintaining the steep pitch necessary for high speed flight.

Figure 9:
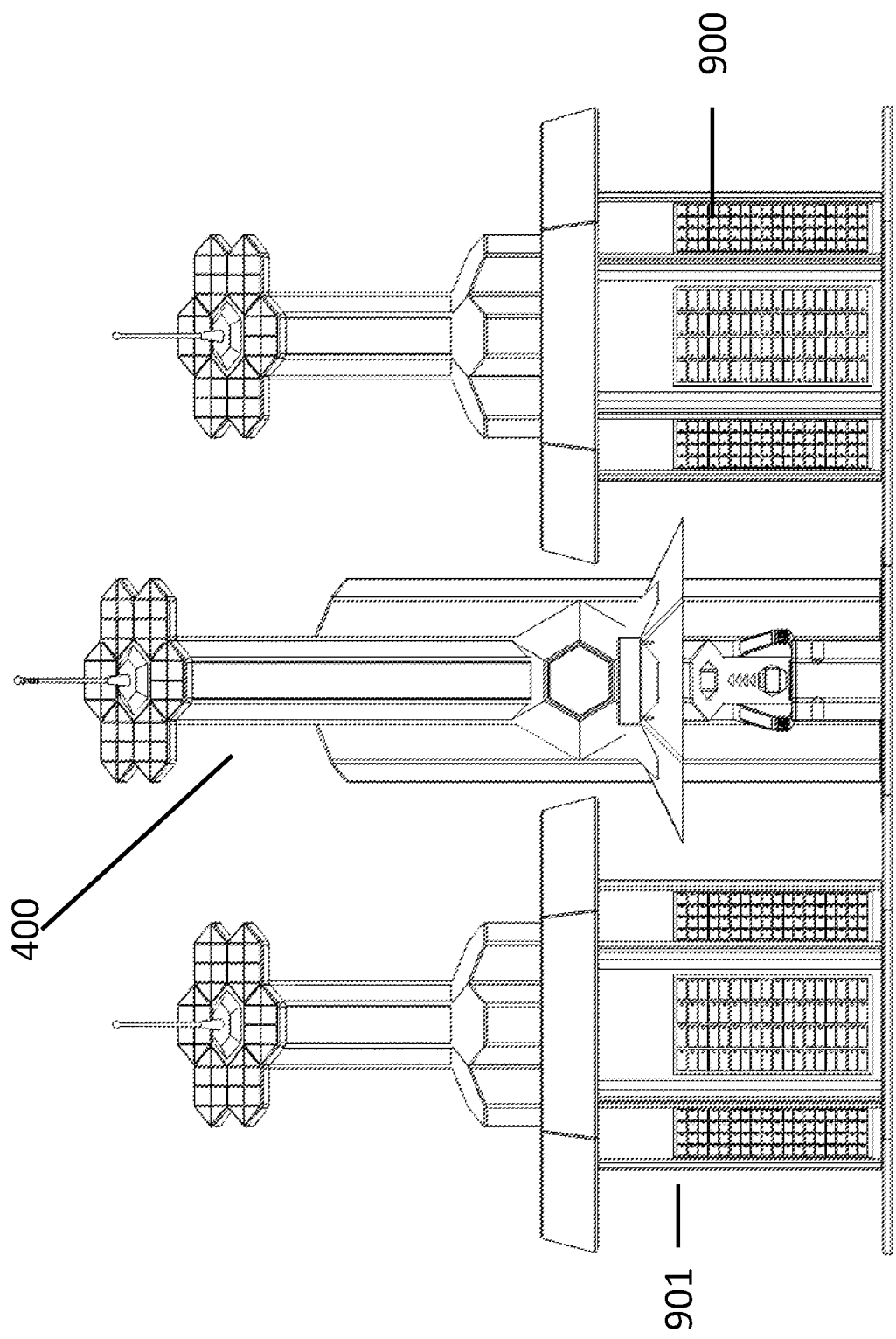
FIG. 9 illustrates a front view of a kiosk integrated with one or more optional structures containing one or more post office boxes according to embodiments of the present inventions.

FIG. 9 illustrates a front view of the kiosk 400 integrated with one or more structures 901 for housing one or more post office boxes 900 (P.O. boxes) such as lock boxes from which standardized shipping container 503 can be securely sent and received. The floor or furniture of the P.O. Box 900 can have a built in scale to verify the standardized shipping container 503 does not exceed its maximum acceptable weight. If the weight is exceeded the standardized shipping container 503 will be rejected. The P.O. boxes 900 can be serviced manually by personnel employed by the kiosk or autonomously.

Figure 10:
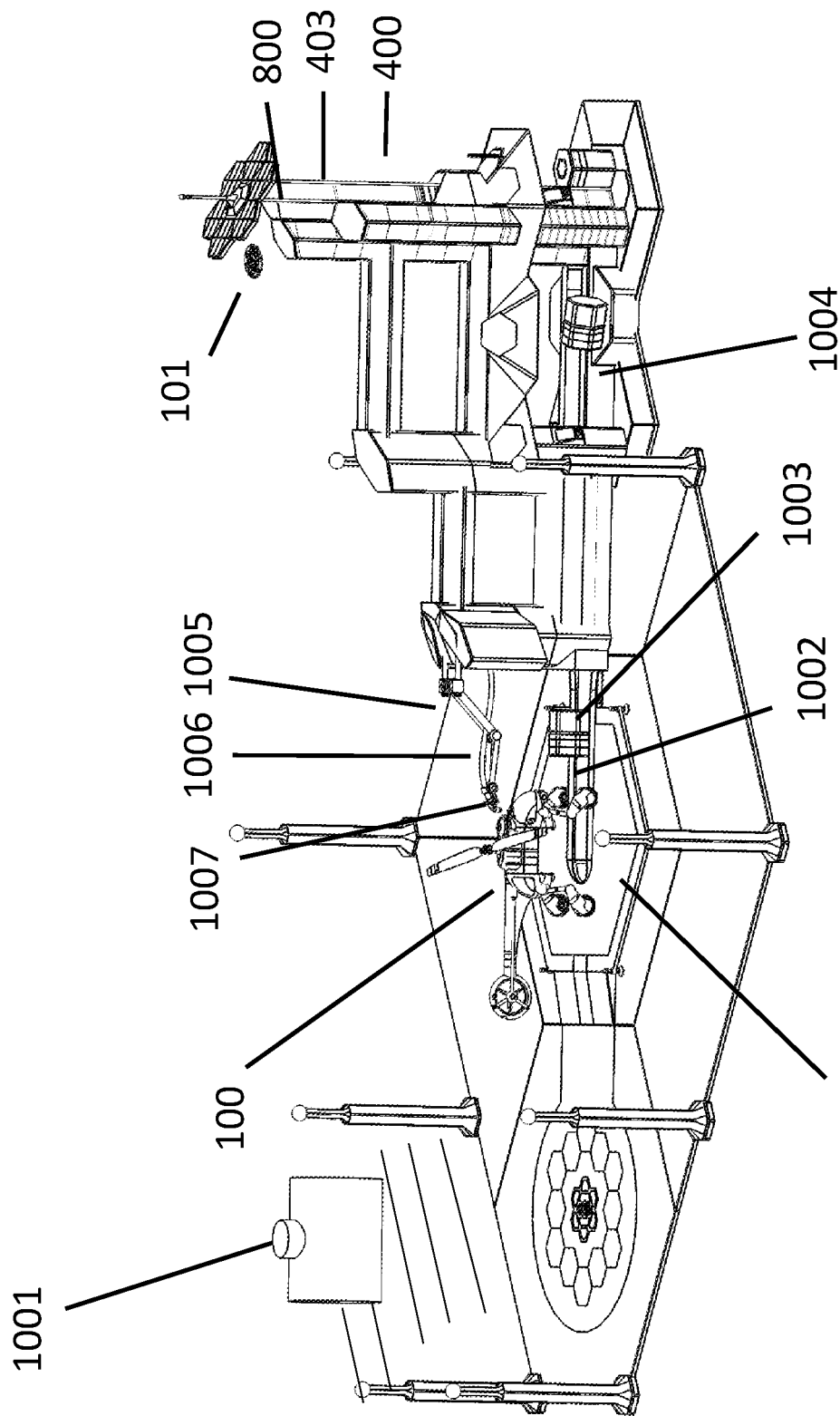
FIG. 10 illustrates a side view of a kiosk integrated with one or more take-off and landing pads for aircraft according to embodiments of the present inventions.

FIG. 10 illustrates a side view of a kiosk 400 integrated with one or more optional helipads 1000 for an aircraft 100. The helipads 1000 can be used to launch, recover, and service said aircraft 100 according to embodiments of the present inventions. The helipad 1000 can be surrounded by a fence to protect aircraft 100 from the public as well as to keep the public a safe distance from the aircraft 100 while in operation. A distribution network may include one or more kiosks 400. Said helipad 1000 can act as a fueling station for aircraft 100 and allow for shipping and receiving of heavy, bulky cargo such as tools and building materials via an aircraft 100. The kiosk 400 can have an integrated fuel tank 1001. The fuel tank 1001 can be embodied above or below ground. The helipad 1000 can have an integrated conveyor system 1002 on which large cargo containers 1003 can be unloaded from the aircraft 100 and transported to a receiving station 1004 located a safe distance from the landing pad to be unloaded by personnel employed by the kiosk 400 or the recipient of the container. A large standardized container 1003 can be seen being unloaded from the aircraft 100. The large standardized container 1003 can be unloaded from the aircraft 100 manually, semi-autonomously, or autonomously. Likewise a large standardized container 1003 can be seen at the end of the conveyor system 1002 awaiting personnel employed by the kiosk 400 or it's recipient to unload it at the receiving station 1004 located a safe distance away from the helipad 1000. The helipad 1000 can comprise an integrated refueling mechanism. The integrated refueling mechanism can autonomously refuel the aircraft 100. The integrated refueling mechanics can comprise a retractable arm 1005, hose 1006, and nozzle 1007. Wherein the arm is retracted while the aircraft 100 is in operation to provide an unobstructed take-off and landing environment. The refueling arm is then extended when the aircraft 100 is ready for fueling. Likewise, FIG. 10 illustrates an unmanned aircraft 101 taking off and landing at the take off and landing area 800 located at the end of the tower created by the long, hollow shaft 403 well above the many obstructions present on the ground. This illustrates how such an elevated take off and landing area 800 provides for a consistently safe, unobstructed take-off and landing path despite dynamic activity on the ground and reduces the need for expensive, and bulky autonomous obstacle avoidance technology.

Figure 11:
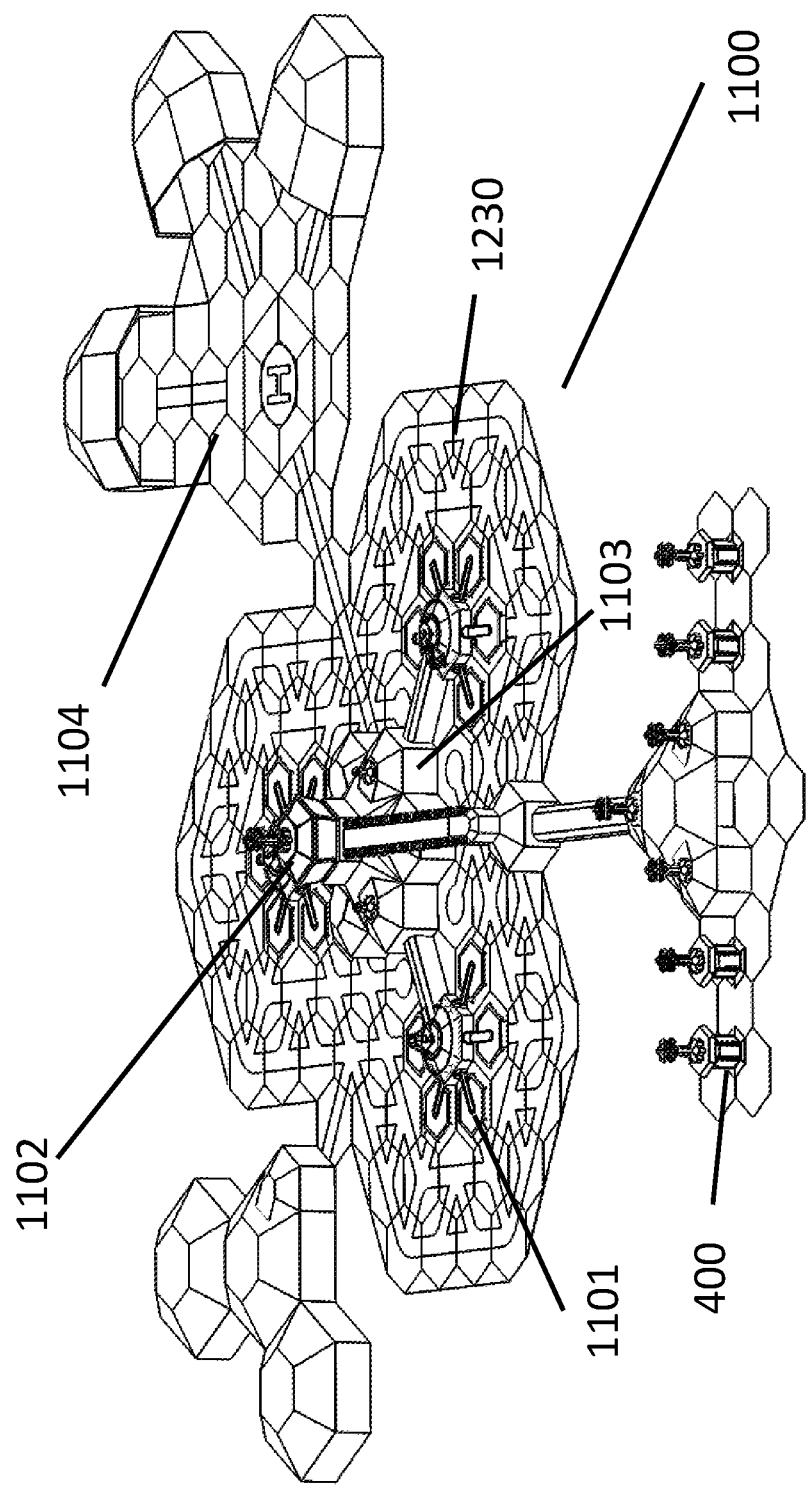
FIG. 11 illustrates an aerial perspective view of a distribution center according to embodiments of the present inventions.

FIG. 11 illustrates an aerial perspective view of a centralized distribution center 1100 of which one or more can be used to create a distribution network according to embodiments of the present inventions. At the centralized distribution center 1100, long range vehicles 100 and short range aerial vehicles 101 can be launched, recovered, re-fueled, loaded, unloaded, maintained, and stored. Distribution centers 1100 serve to launch, recover, maintain, and store long range aircraft 100 as well as shorter range unmanned aircraft 101. The distribution center 1100 can be manned, semi-autonomous, or fully-autonomous. The distribution center 1100 can consist of one or more helicopter landing pads 1101, a runway, a control tower 1102, above or underground fuel reserves, a sorting and dispatching facility 1103 and optionally one or more kiosks 400, and/or Post Office (P.O.) boxes and maintenance and storage hangers 1104. The distribution centers 1100 can have embedded wireless communication equipment such as radio, mobile telephone network, or satellite links. Likewise, the distribution centers 1100 can support wired communication via connection to a telephone network, Ethernet, internet, and fiber optic.

Figure 12:
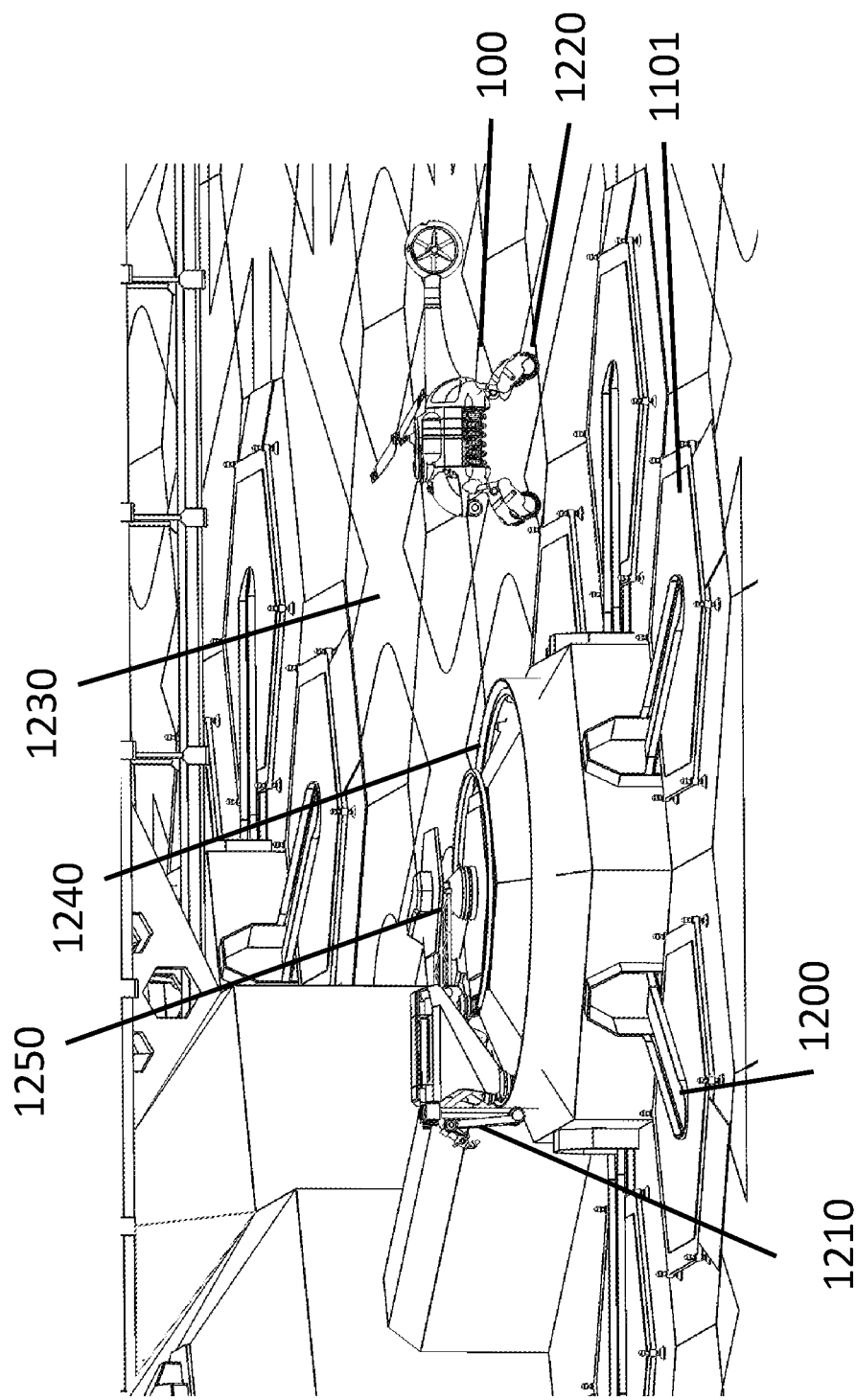
FIG. 12 illustrates an aerial perspective view of a long range vehicle landing at a distribution center according to embodiments of the present inventions.

FIG. 12 illustrates an aerial perspective view of a distribution center 1100 and landing pads 1101 for long range aircraft 100 embodied as unmanned helicopters according to embodiments of the present inventions, landing at a distribution center 1100 where it will be prepared to be unloaded and refueled, and then subsequently reloaded. The landing pads 1101 can have an integrated conveyer belt system 1200 or other robotic transport system. The landing pads 1101 can have an integrated re-fueling station 1210 capable of serving aircraft on one or more landing pads 1101. The integrated re-fueling station 1210 has a refueling arm that can extend to refuel a long range vehicle 100 after landing on a landing pad 1100. The refueling arm can be mounted on a circular rail system 1240 upon which it can swivel from landing pad 1101 to landing pad 1101 about a hub 1250 in order to service multiple aircraft 100. The fueling arm can be retractable. The long range vehicles 100 embodied as unmanned helicopters can have powered wheels 1220 and can navigate themselves around the distribution center by their own power on the ground. A grid 1230 can provide a navigation tool for them to optionally utilize. The grid can use a number of relative navigation techniques implementing radio beacons, visual patterns, images of visual patterns, cameras, infrared beacons, or some other high precision relative navigation system to achieve repeatable results.

Figure 13:
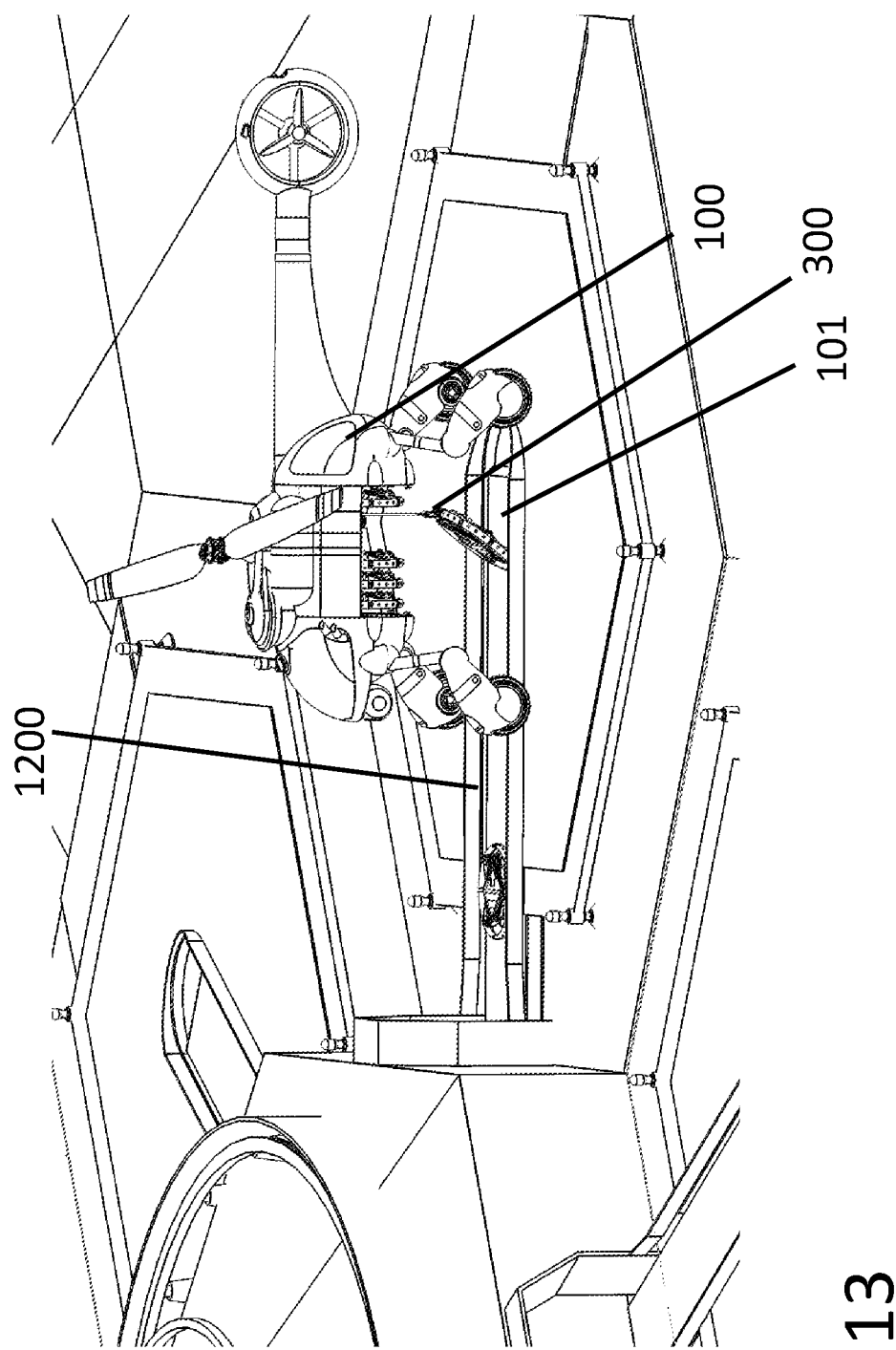
FIG. 13 illustrates a perspective view of short range unmanned aircraft vehicles being unloaded from the payload bay of a long range vehicle at the distribution center according to embodiments of the present inventions.

FIG. 13 illustrates a perspective view of short range aircraft 101 being unloaded from the long range aircraft 100 onto a conveyor belt 1200 at the distribution center 1100 according to embodiments of the present inventions. The short range vehicles 101 are embodied as multi-copters according to embodiments of the present inventions. The long range vehicles 100 are embodied as unmanned helicopters according to embodiments of the present inventions. The short range vehicles 101 can be autonomously or semi-autonomously unloaded via the vehicle's retractable hook system 300 or other integrated mechanical system or manually unloaded by personnel. Once on the conveyor belt 1200 or other transport mechanism, the short range vehicles 101 are carried into the distribution center's 1100 internal sorting facility 1103. Inside the sorting facility 1103 the short range vehicles 101 payload bays 201 are optionally unloaded and loaded depending upon the carried containers 503 delivery destination. The cargo is sorted and dispatched. The entirety of this process can occur manually, semi-autonomously, or fully autonomously.

Figure 14:
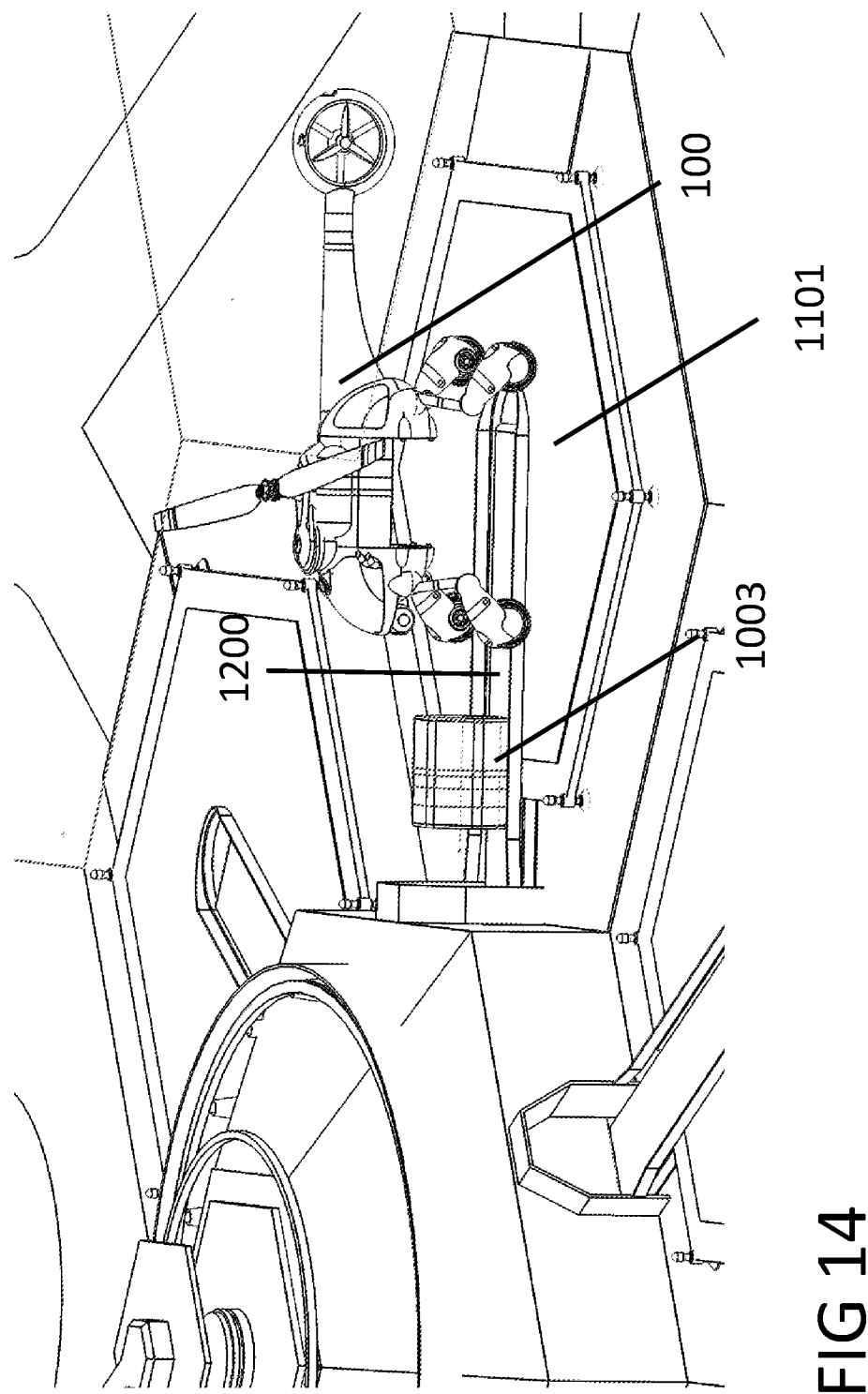
FIG. 14 illustrates a perspective view of a long range aircraft vehicle being loaded or unloaded with a large cargo container at the distribution center according to embodiments of the present inventions.

FIG. 14 illustrates a perspective view of a long range vehicle 100 being loaded with a large cargo container 1003 at the distribution center 1100 according to embodiments of the present inventions. FIG. 13 also illustrates a perspective view of a large standardized shipping container 1003 being brought back out to the landing pads 1101 on the main distribution centers 1100 conveyor belt system 1200 or other integrated mechanical transport system according to embodiments of the present inventions. These larger shipping containers 1003 can be loaded with a plurality of small standardized containers 503 or bulky cargo that will not otherwise fit in the small standardized containers 503. These containers 1003 can be loaded manually, semi-autonomously, or fully-autonomously. A large cargo container 1300 can be loaded onto a long range vehicle 100 according to embodiments of the present inventions. The long range vehicle 100 can be loaded manually, semi-autonomously, or fully-autonomously. The long range vehicle 100 embodied as an unmanned helicopter can be fitted with actuated, and/or wheeled landing gear 1400. This landing gear 1400 allows for the helicopter to squat down and autonomously pick-up or drop-off the container. The cargo bay 102 of the long range vehicle 100 can be re-configurable and can accept either the large standardized containers 1300 or a plurality of short range vehicles 101. The cargo bay 102 can also be configured to carry one or more short range vehicles 101 along with one or more large standardized cargo containers 1300.

An embodiment of a system includes two or more independently functional vehicles that can be mechanically coupled to form a single, independently functional vehicle and subsequently de-coupled. According to a further embodiment, at least one of the vehicles is a long range vehicle and one or more are short range vehicles. According to a further embodiment, one or more of the vehicles are aerial vehicles. According to a further embodiment, one or more of the aerial vehicles are used for delivering cargo. According to a further embodiment, one or more of the delivery vehicles are helicopters. According to a further embodiment, the helicopters are fitted with a cargo bay. According to a further embodiment, the cargo bay can be configured to launch and recover one or more short range vehicles. According to a further embodiment, the launch and recovery can occur in flight such as in a multi-copter. According to a further embodiment, the launch and recovery can be achieved autonomously. According to a further embodiment, the launch and recovery is achieved using a mechanical hook, lift and rack system such as in a helicopter. According to a further embodiment, the short range vehicles can take-off and land from a kiosk. According to a further embodiment, the kiosk can store one or more short range vehicles. According to a further embodiment, the kiosk has an elevated take-off and landing area to allow for an unobstructed take-off and landing approach. According to a further embodiment, the take-off and landing area has a door for security. According to a further embodiment, there is an interlock 507 behind the door. According to a further embodiment, the kiosk has a series of elevators and conveyor belts internally to maneuver short range vehicles. According to a further embodiment, the kiosk can securely warehouse standardized shipping container. According to a further embodiment, the kiosk has a user interface. According to a further embodiment, one or more of the short range vehicles are unmanned. According to a further embodiment, one or more of the helicopters are unmanned. According to a further embodiment, one or more of the unmanned vehicles are multi-copters. According to a further embodiment, one or more of multi-copters have shielded rotors for safety. According to a further embodiment, one or more of the multi-copters are fitted with a payload bay. According to a further embodiment, the payload bay accepts a standardized shipping container.

An embodiment of a system includes a plurality of kiosks. According to a further embodiment, the plurality of kiosks is capable of launching the multi-copters. According to a further embodiment, the plurality of kiosks is capable of recovering the multi-copters. According to a further embodiment, the plurality of the kiosks is capable of warehousing a plurality of the multi-copters. According to a further embodiment, the kiosks are capable of re-charging the multi-copters. According to a further embodiment, the plurality of kiosks has an elevated entrance/exit for the launch and recovery. According to a further embodiment, the elevated entrance/exit serves to disallow the interception of entering or exiting multi-copters. According to a further embodiment, the elevated entrance/exit serves to provide a safe, unobstructed flight path for entering or exiting multi-copters above a cluttered ground environment. According to a further embodiment, the kiosks are used by the consumer to send payload. According to a further embodiment, the kiosks are used by the consumer to receive payload. According to a further embodiment, the kiosks are capable of accepting the standardized containers. According to a further embodiment, the standardized container has a specified maximum weight. According to a further embodiment, the kiosks have an integrated scale for weighing standardized containers. According to a further embodiment, the kiosks software will not accept a standardized shipping container without being weighed on the scale. According to a further embodiment, the kiosks software will not accept a standardized container weighed on the scale if it exceeds the specified maximum weight. According to a further embodiment, the kiosks have a user interface. According to a further embodiment, the user interface consists of a keypad. According to a further embodiment, the user interface consists of a touch-screen. According to a further embodiment, the user interface is capable of assigning a delivery address for the standardized container being entered. According to a further embodiment, the kiosks can accept payments. According to a further embodiment, the payments can be made via credit card. According to a further embodiment, the credit card payments are made via credit card scanner. According to a further embodiment, the payments can be made via cell phone text. According to a further embodiment, the payments can be made via cash. According to a further embodiment, the payments can be made via coins. According to a further embodiment, the kiosks have a door to insert or extract the standardized containers. According to a further embodiment, the door will not open unless the standardized is weighed on the scale and does not exceed the maximum weight. According to a further embodiment, the kiosks are capable of warehousing a plurality of the standardized containers. According to a further embodiment, the kiosks are capable of tracking the standardized containers warehoused within. According to a further embodiment, the kiosks are capable of loading the unmanned aircraft such for example as multi-copters. According to a further embodiment, the kiosks are capable of dispatching the loaded multi-copters. According to a further embodiment, the kiosks can be run off grid. According to a further embodiment, the kiosks can use solar power. According to a further embodiment, the kiosks have a satellite link. According to a further embodiment, the kiosks have a radio link. According to a further embodiment, the kiosks can be connected to a plurality of P.O. Boxes. According to a further embodiment, the P.O. Boxes can be used to send and receive the standardized containers. According to a further embodiment, the floor of each P.O. Box is a scale. According to a further embodiment, any standardized container placed inside a P.O. Box that exceed the maximum weight as weighed by the scale will not be shipped.

An embodiment of system includes s plurality of distribution centers. According to a further embodiment, helicopters can be launched and recovered. According to a further embodiment, the helicopters can be maintained. According to a further embodiment, the helicopters can be stored. According to a further embodiment, the multi-copters can be maintained. According to a further embodiment, the multi-copters can be stored. According to a further embodiment, the helicopters multi-copter payload can be loaded and unloaded. According to a further embodiment, the standardized containers can be loaded and unloaded from the multi-copters. According to a further embodiment, standardized containers can be stored. According to a further embodiment, standardized containers can be sorted. According to a further embodiment, standardized containers can be tracked. According to a further embodiment, standardized containers can be dispatched. According to a further embodiment, standardized containers can be loaded and unloaded from the helicopters. According to a further embodiment, the contents of the standardized containers can be loaded and unloaded. According to a further embodiment, the standardized containers can be stored. According to a further embodiment, the contents of the standardized containers can be sorted. According to a further embodiment, the contents of the standardized containers can be sorted. According to a further embodiment, the standardized container can be tracked. According to a further embodiment, the contents of the standardized container can be tracked. According to a further embodiment, the distribution centers can refuel the helicopters. According to a further embodiment, the distribution centers can re-charge the multi-copters.

An embodiment of a system includes a plurality of remote outposts. According to a further embodiment, one or more of the remote outposts contain one or more of the kiosks. According to a further embodiment, one or more of the remote outposts are capable of refueling the helicopters. According to a further embodiment, one or more of the outposts are capable of sending and receiving the large standardized containers.

An embodiment of a system includes a smart phone app. According to a further embodiment, the smartphone can communicate with the plurality of kiosks. According to a further embodiment, the smartphone app can communicate with the plurality of distribution centers. According to a further embodiment, the smartphone app can communicate with the plurality of remote outposts. According to a further embodiment, the smartphone app can communicate with the multi-copters. According to a further embodiment, the smart phone app can communicate with the helicopters. According to a further embodiment, the smartphone app can designate the shipping address of the standardized containers. According to a further embodiment, the smartphone app can designate the shipping address of the standardized containers. According to a further embodiment, the smartphone app can track the shipping containers. According to a further embodiment, the smartphone app can communicate with kiosk to verify a user's identity. According to a further embodiment, the smartphone app can communicate with the distribution centers to verify a user's identity. According to a further embodiment, the smartphone app can communicate with the remote outposts to verify a user's identity.

An embodiment of system includes s plurality of standardized containers. According to a further embodiment, one or more outside or inside walls of the standardized containers can be embodied as a digital screen. According to a further embodiment, the digital screen can be used to display information or advertisements. According to a further embodiment, the standardized container can be fitted with speakers and interact with the consumer audibly to convey information or advertisements. According to a further embodiment, advertisements displayed on the kiosks user interface of standardized containers can be opt-in or opt-out. According to a further embodiment, if a consumer opts-in the price of shipping can be reduced or eliminated.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. A method for autonomously distributing items via unmanned aircraft, comprising the steps of:
   directing an unmanned aircraft to navigate to a loading area located inside of a tower comprising at least two shafts, wherein the unmanned aircraft navigates to the loading area by descending in-flight through the tower via a first shaft;
   loading or unloading the unmanned aircraft at the loading area; and
   directing the unmanned aircraft to navigate from the loading area to an exit from the tower by ascending in-flight through the tower via a second shaft.

* * * * *